United States Patent
Mikacich

(10) Patent No.: US 9,392,911 B2
(45) Date of Patent: Jul. 19, 2016

(54) APPARATUS AND METHOD FOR DISPENSING LIQUID

(76) Inventor: Coburn Mikacich, Orlando, FL (US)

( * ) Notice: Subject to any disclaimer, the term of this patent is extended or adjusted under 35 U.S.C. 154(b) by 10 days.

(21) Appl. No.: 13/486,867

(22) Filed: Jun. 1, 2012

(65) Prior Publication Data

US 2013/0320047 A1 Dec. 5, 2013

(51) Int. Cl.
| | |
|---|---|
| *B67D 7/06* | (2010.01) |
| *A47J 45/06* | (2006.01) |
| *B65D 90/12* | (2006.01) |
| *B67D 3/00* | (2006.01) |
| *B67C 11/02* | (2006.01) |
| *B65D 47/06* | (2006.01) |
| *B67C 9/00* | (2006.01) |
| *B65D 88/26* | (2006.01) |

(52) U.S. Cl.
CPC ............... *A47J 45/06* (2013.01); *B65D 47/06* (2013.01); *B65D 47/063* (2013.01); *B65D 88/26* (2013.01); *B65D 90/125* (2013.01); *B67C 9/00* (2013.01); *B67C 11/02* (2013.01); *B67D 3/0029* (2013.01); *B67D 3/0038* (2013.01)

(58) Field of Classification Search
CPC ........... A47J 42/40; B67C 9/00; B67C 11/00; B67C 11/02; B05C 17/00516; B65D 88/26; B65D 88/54; B65D 90/125; B65D 47/06; B65D 47/063; B67D 3/00; B67D 3/0038; B67D 3/0029
USPC .............. 222/465.1–466, 526–527, 530, 222/608–610, 460–462, 185.1, 186; 141/391, 106, 363–366, 369–373, 141/375–376, 378
See application file for complete search history.

(56) References Cited

U.S. PATENT DOCUMENTS

| | | | | |
|---|---|---|---|---|
| 478,303 | A * | 7/1892 | Allgood | F16N 33/00 141/106 |
| 1,315,724 | A * | 9/1919 | Hipwell | 222/481 |
| 2,053,533 | A * | 9/1936 | Rizor | 222/530 |
| 3,394,849 | A * | 7/1968 | Streeter | 222/185.1 |
| 3,552,599 | A * | 1/1971 | Redding | 220/675 |
| 4,022,257 | A * | 5/1977 | O'Connell | 141/98 |
| 4,243,162 | A * | 1/1981 | Klygis | 222/530 |
| 4,665,958 | A * | 5/1987 | Holloway | B67C 11/02 141/106 |
| 4,913,318 | A * | 4/1990 | Forrester | 222/129 |
| 5,385,180 | A * | 1/1995 | Wittman | B67C 11/02 141/106 |
| 5,540,264 | A * | 7/1996 | Harp | 141/106 |
| 5,667,113 | A * | 9/1997 | Clarke et al. | 222/608 |
| 5,890,595 | A * | 4/1999 | Credle, Jr. | 206/501 |
| 5,927,356 | A * | 7/1999 | Henderson | 141/391 |
| 6,109,313 | A * | 8/2000 | Phelps | 141/106 |
| 6,116,299 | A * | 9/2000 | Cummins et al. | B67C 9/00 141/332 |
| 6,260,589 | B1 * | 7/2001 | Zeppieri et al. | 141/106 |
| 6,276,410 | B1 * | 8/2001 | Esmeralda | B67C 11/02 141/100 |
| 6,976,286 | B1 * | 12/2005 | Sanabria | 15/264 |
| 7,185,788 | B2 * | 3/2007 | Morris | 222/129 |
| 7,357,279 | B2 * | 4/2008 | Kuo | 222/185.1 |
| 7,946,317 | B1 * | 5/2011 | Organ | F01M 11/0408 141/331 |
| 2006/0278664 | A1 * | 12/2006 | Shultz | B67C 11/02 222/461 |

* cited by examiner

*Primary Examiner* — Paul R Durand
*Assistant Examiner* — Andrew P Bainbridge
(74) *Attorney, Agent, or Firm* — Mark Young, P.A.

(57) ABSTRACT

An apparatus and method for dispensing liquid from one container into another container is disclosed. The apparatus is placed over a fuel tank and receives an inverted, portable fuel container to allow fuel to be transferred from the portable fuel container into the fuel tank in a hands-free manner. The apparatus includes a body, tube, base, and supporting members.

12 Claims, 2 Drawing Sheets

APPARATUS AND METHOD FOR DISPENSING LIQUID

FIELD

The embodiments relate generally to an apparatus and method for dispensing liquid from one container into another container.

BACKGROUND

Handheld gasoline containers are ubiquitous. For decades, people have filled up a portable gasoline container at a gas station and then used that container to pour gasoline into their car, boat, lawn mower, or other device with a gasoline motor. One limitation of the prior art is that a person has to physically hold the container until all of the liquid has been dispensed. Another limitation is that liquid sometimes leaks onto the hands or clothes of the person holding the container.

What is needed is a device that will enable a person to dispense liquid from one container into another container without physically holding the container during the dispensing process.

DETAILED DESCRIPTION OF ONE OR MORE EMBODIMENTS

Figure 1:
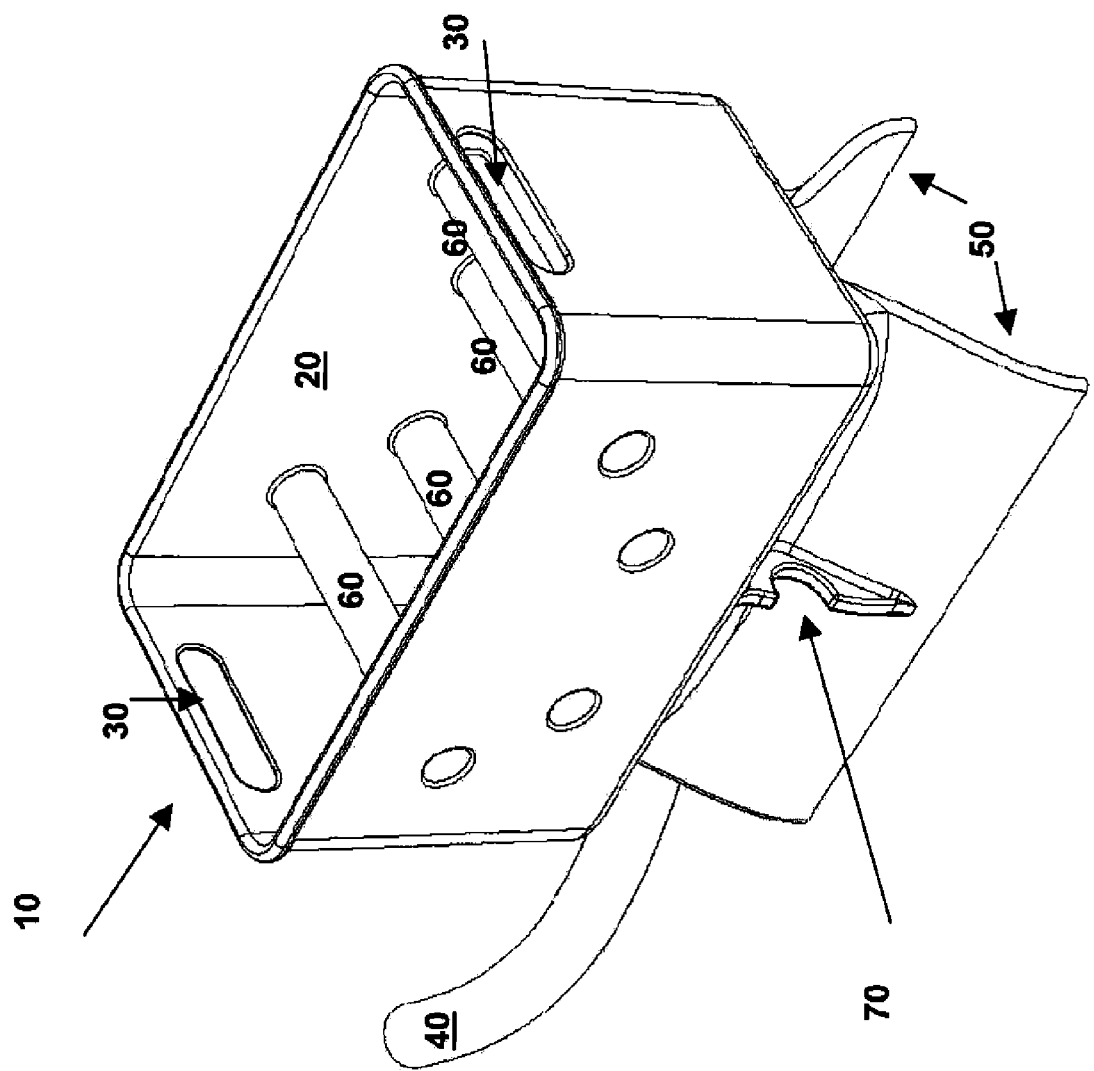
FIG. 1 is a diagram of an embodiment for dispensing liquid.

FIG. 1 depicts an embodiment for dispensing of liquid. Dispensing device 10 comprises a body 20. Body 20 comprises handles 30 to enable a person to easily hold dispensing device 10. Dispensing device 10 further comprises tube 40 to transfer liquid from dispensing device 10 into another container, such as a gas tank. Dispensing device 10 further comprises supporting members 50, which are used to support dispensing device 10 while the dispensing occurs. Body 20 preferably is watertight when upright so that liquid does not seep out of body 20 except through tube 40.

In one embodiment, body 20 is manufactured using a single-mold plastic technique that is well-known to those of ordinary skill in the art. Handles 30 in this embodiment are apertures in body 20 to accommodate a person's hands. Handles 30 optionally could comprise physical devices, rather than apertures, that attach to body 20 that a person will hold with his or her hands. Tube 40 preferably is a flexible device to enable a person to move tube 40 to place the loose end within the other container such as a gas tank. Tube 40 optionally comprises rubber, soft plastic, sectioned aluminum, or other known flexible and waterproof materials. Supporting members 50 in this embodiment comprise two plastic pieces that are used to support body 20. For example, this design would allow a person to place dispensing device 10 on a flat surface, such as a boat deck, car roof, or the ground, while dispensing the liquid. Body 20 further comprises a floor, not shown, that angles downward from the outer perimeter of the floor toward a hole around which tube 40 is attached.

Dispensing device 10 further comprises supporting members 60. Supporting members 60 are located within body 20 and are designed to support a container, such as a portable gasoline container, in an inverted position to allow liquid to flow from the container into body 20, and from body 20 into tube 40 and into the other container being filled. In this embodiment, supporting members 60 comprise four horizontal bars attached to body 20. The bars are placed such that two bars are lower than the other two bars, which one of ordinary skill in the art will understand enables a container to be supported.

Dispensing device further comprises notch 70, into which tube 40 can be inserted for easy storage when not in use.

Figure 2:
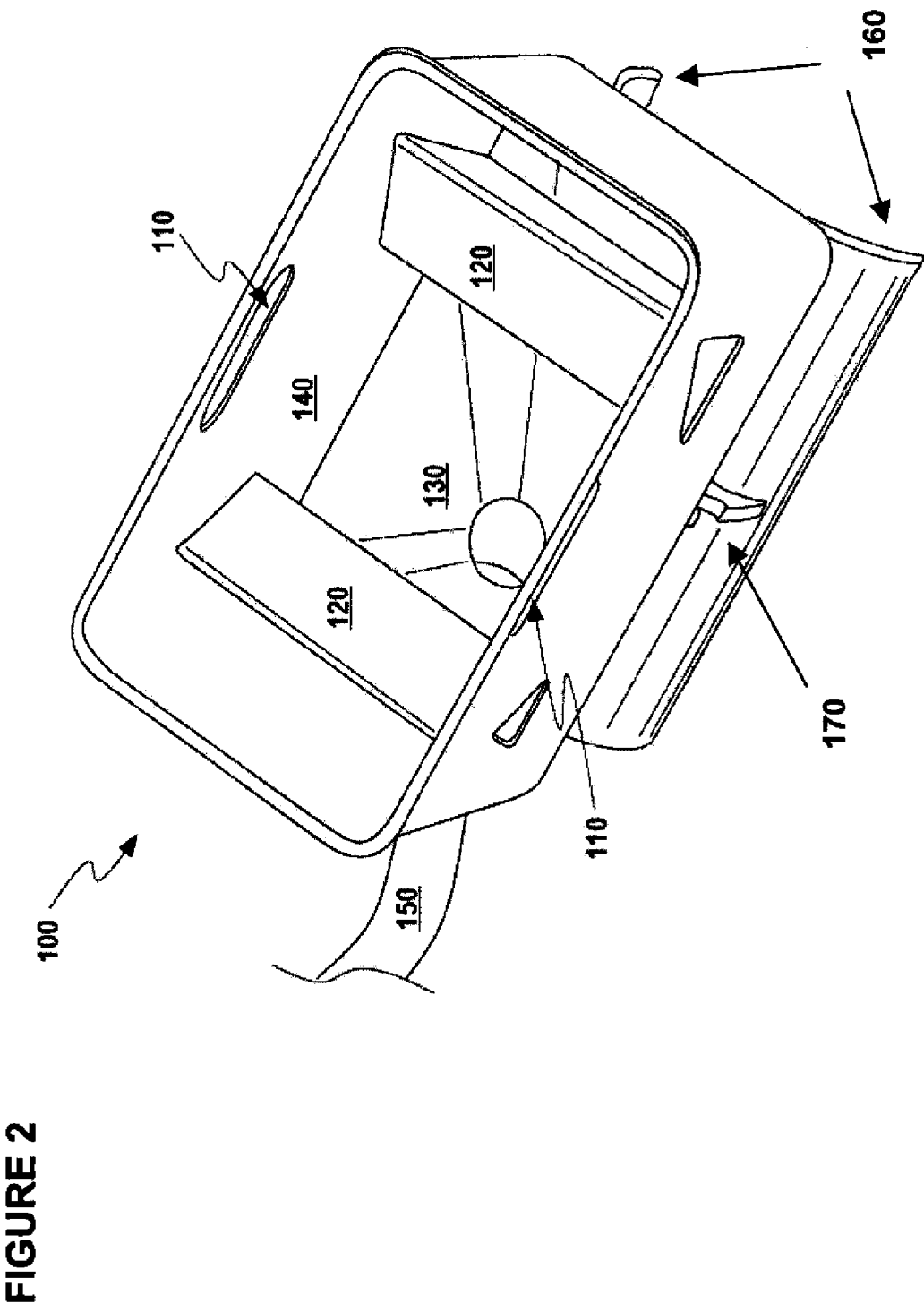
FIG. 2 is a diagram of another embodiment dispensing liquid.

FIG. 2 shows another embodiment. Dispensing device 100 is shown. Dispensing device 100 comprises body 140 and handles 110. Handles 110 are located on the longer sides of dispensing device 100, whereas handles 60 were shown in FIG. 1 as located on the shorter sides of dispensing device 10. Dispensing device 100 comprises supporting members 120. Here, supporting members 120 comprise horizontal pieces attached to the body 140 of dispensing device 100, where the horizontal pieces include rectangular faces. Supporting members support a container, such as a portable container, in an inverted position, and the portable container will rest against the rectangular faces. The floor 130 of dispensing device 100 is angled downward from the outer perimeter of the floor 130 toward the hole to which tube 150 is attached. One of ordinary skill in the art will understand that floor 130 allows liquid to flow into tube 150.

Dispensing device 100 further comprises supporting members 160 for holding dispensing device 100 upright during use, and notch 170 for storing tube 150 when not in use.

One or ordinary skill in the art will appreciate that FIGS. 1 and 2 are merely exemplary and that numerous variations could be used, and that certain characteristics shown in Figures I and 2 can be used interchangeably in the two embodiments.

In addition, while the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. An apparatus for dispensing liquid fuel from a portable fuel container, comprising:
    a body, wherein the body comprises a floor that slopes downward toward a hole, and a pair of walls, including a first wall and a second wall, each of the first wall and second wall extending upwardly from the floor to a top edge, and the first and second wall being spaced apart and in opposed relation;
    a tube attached to the body to surround the hole for transferring fuel into a fuel tank;
    a base attached to the body for holding the body upright; and
    said body further comprising supporting members for holding a container in a hands-free manner, each of said supporting members extending from the first wall to the second wall of the pair of walls, said supporting members including a first pair of supporting members and a second pair of supporting members, the first pair of supporting members being at a first height on the first wall and second wall, and the second pair of supporting members being at a second height on the first wall and second wall, the first height being greater than the second height, and a first distance between the first pair of supporting members, a second distance between the second pair of supporting members, and the first distance being greater than the second distance,
    wherein the body is a single-molded plastic.

2. The apparatus of claim 1, further comprising handles.

3. The apparatus of claim 2, wherein the handles are apertures in the body.

4. The apparatus of claim 1, wherein the tube comprises rubber.

5. The apparatus of claim 1, wherein the supporting members comprise a plurality of horizontal rods.

6. The apparatus of claim 1, wherein the supporting members comprise a plurality of rectangular pieces.

7. The apparatus of claim 1, further comprising a notch attached to the body for holding the tube.

8. A portable apparatus for dispensing liquid fuel from a portable fuel container in a hands-free manner, comprising:
- a body, wherein the body comprises a plurality of handles and a floor that slopes downward toward a hole, and a pair of opposed walls, including a first wall and a second wall, extending upwardly from the floor;
- a tube attached to the body to surround the hole for transferring liquid fuel into a fuel tank;
- a base attached to the body for holding the body upright; and
- a pair of supporting members within the body for holding a container in an inverted position without human assistance, each of said pair of supporting members extending from the first wall to the second wall of the pair of opposed walls, each of said pair supporting members being tubular and having a triangular section shape, and each of said pair of supporting members including an oblique generally planar surface extending from a lower edge to an upper edge, the lower edge of each of said pair of supporting members being closer to the hole than the upper edge, and a first distance between the lower edges of said pair of supporting members, and a second distance between the upper edges of said pair of supporting members, and the first distance being less than the second distance, wherein the body is a single-molded plastic.

9. The apparatus of claim 8, wherein the handles are apertures in the body.

10. The apparatus of claim 8, wherein the supporting members comprise a plurality of horizontal rods.

11. The apparatus of claim 8, wherein the supporting members comprise a plurality of rectangular pieces.

12. The apparatus of claim 8, further comprising a notch attached to the body for holding the tube.

* * * * *